United States Patent
Dunjic et al.

(10) Patent No.: US 12,028,407 B2
(45) Date of Patent: *Jul. 2, 2024

(54) SYSTEM AND METHOD FOR UPDATING INTERFACE ELEMENTS BASED ON REAL-TIME TRANSFER PROTOCOL AVAILABILITY

(71) Applicant: The Toronto-Dominion Bank, Toronto (CA)

(72) Inventors: Milos Dunjic, Oakville (CA); David Samuel Tax, Toronto (CA); Jonathan Joseph Prendergast, West Chester, PA (US); Kushank Rastogi, Toronto (CA); Vipul Kishore Lalka, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,626

(22) Filed: Jun. 20, 2023

(65) Prior Publication Data

US 2023/0336617 A1    Oct. 19, 2023

Related U.S. Application Data

(63) Continuation of application No. 17/400,756, filed on Aug. 12, 2021, now Pat. No. 11,750,687.

(51) Int. Cl.
*H04L 67/06* (2022.01)
*H04L 65/65* (2022.01)

(52) U.S. Cl.
CPC .............. *H04L 67/06* (2013.01); *H04L 65/65* (2022.05)

(58) Field of Classification Search
CPC ................................. H04L 67/06; H04L 65/65
See application file for complete search history.

(56) References Cited

U.S. PATENT DOCUMENTS

| | | |
|---|---|---|
| 6,721,716 B1 | 4/2004 | Gross |
| 7,627,524 B2 | 12/2009 | Bennett et al. |
| 7,660,766 B1 | 2/2010 | Lawson et al. |
| 7,840,465 B1 | 11/2010 | Juarez et al. |
| 8,285,641 B2 | 10/2012 | Cataline et al. |
| 8,290,865 B2 | 10/2012 | Lawrence et al. |
| 8,744,959 B2 | 6/2014 | Smith et al. |

(Continued)

OTHER PUBLICATIONS

John Hintze; Pros & Cons of Real-Time Payments; Published in Association for Financial Professionals; https://www.afponline.org/ideas-inspiration/topics/articles/Details/pros-cons-of-real-time-payments/ Dec. 13, 2019.

*Primary Examiner* — Benjamin M Thieu
(74) *Attorney, Agent, or Firm* — Rowand LLP

(57) ABSTRACT

A server computer system, comprises a processor; a communications module coupled to the processor; and a memory coupled to the processor, the memory storing instructions that, when executed, configure the processor to obtain information associated with a request to transfer data to a data record; determine, based on an identifier associated with the data record, whether a real-time transfer protocol is available to complete the transfer; and send, via the communications module and to a client device associated with a recipient of the request to transfer the data to the data record, a signal updating one or more interface elements of an interface displayed on the client device based on whether the real-time transfer protocol is available to complete the transfer.

20 Claims, 10 Drawing Sheets

(56) References Cited

U.S. PATENT DOCUMENTS

| | | |
|---|---|---|
| 9,996,825 B1 | 6/2018 | Casey et al. |
| 10,373,154 B2 | 8/2019 | Kimberg et al. |
| 10,748,127 B2 | 8/2020 | Novac et al. |
| 11,068,866 B1 | 7/2021 | Hecht et al. |
| 2002/0198798 A1 | 12/2002 | Ludwig et al. |
| 2002/0198828 A1 | 12/2002 | Ludwig et al. |
| 2009/0327111 A1 | 12/2009 | Bulawa et al. |
| 2013/0110600 A1 | 5/2013 | Lu |
| 2016/0253639 A1 | 9/2016 | Sharma |
| 2020/0019939 A1 | 1/2020 | Wolf et al. |
| 2021/0019718 A1 | 1/2021 | Moskowitz et al. |
| 2022/0245625 A1 | 8/2022 | Filter et al. |

SYSTEM AND METHOD FOR UPDATING INTERFACE ELEMENTS BASED ON REAL-TIME TRANSFER PROTOCOL AVAILABILITY

CROSS-REFERENCE TO RELATED APPLICATIONS

This application is a continuation of U.S. patent application Ser. No. 17/400,756, filed on Aug. 12, 2021, the entire contents of which are incorporated herein by reference.

TECHNICAL FIELD

The present disclosure relates to systems and methods for updating interface elements based on real-time transfer protocol availability.

BACKGROUND

Transfer protocols may be used to transfer data between data records. A real-time transfer protocol may be available to transfer data between data records however this may be unknown to the party initiating the data transfer.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
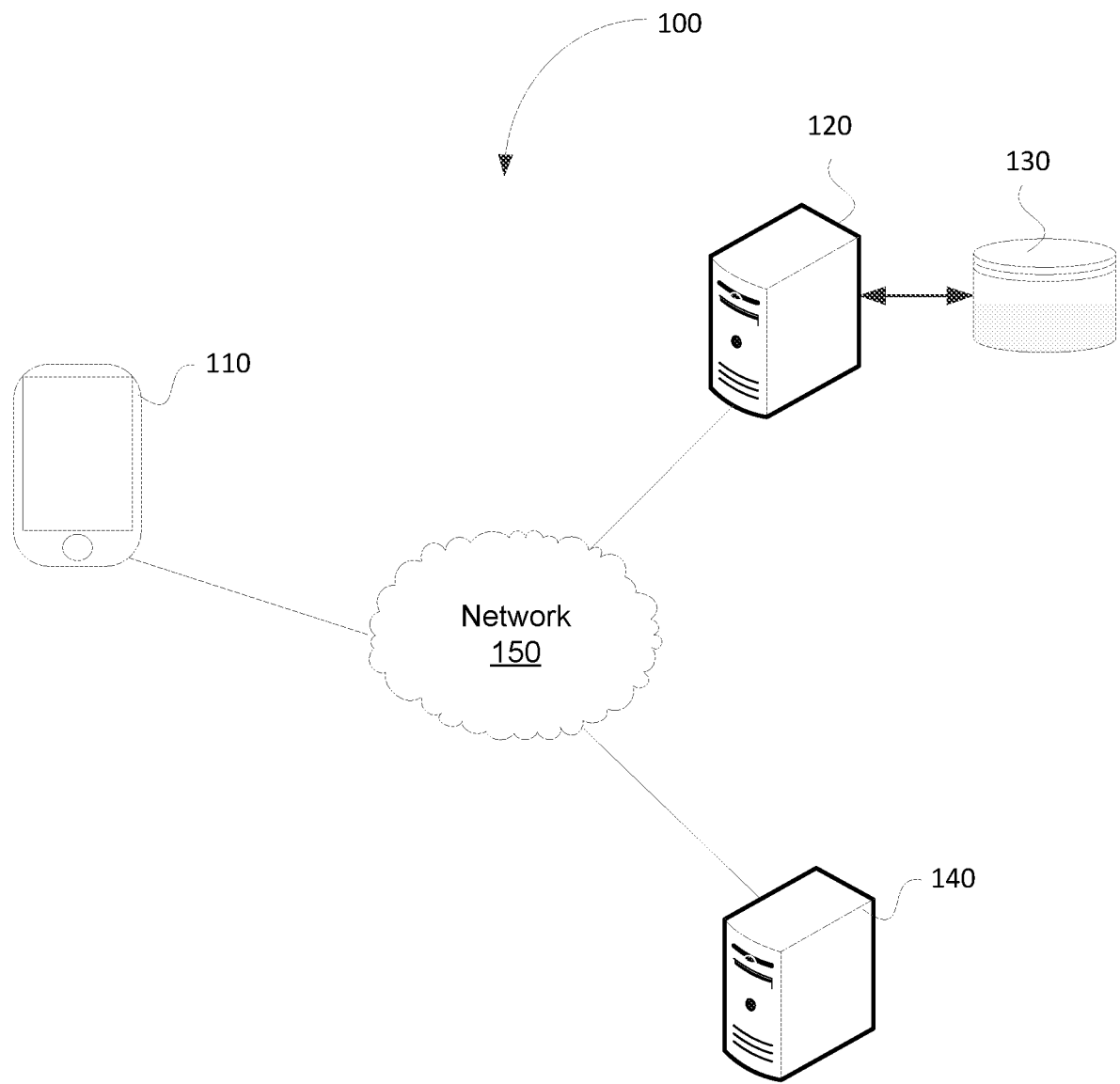
FIG. 1 is a schematic diagram illustrating an operating environment of an example embodiment.

In an aspect there is provided a server computer system, comprising a processor; a communications module coupled to the processor; and a memory coupled to the processor, the memory storing instructions that, when executed, configure the processor to obtain information associated with a request to transfer data to a data record; determine, based on an identifier associated with the data record, whether a real-time transfer protocol is available to complete the transfer; and send, via the communications module and to a client device associated with a recipient of the request to transfer the data to the data record, a signal updating one or more interface elements of an interface displayed on the client device based on whether the real-time transfer protocol is available to complete the transfer.

In one or more embodiments, the signal updating the one or more interface elements is sent at a first date when it is determined that the real-time transfer protocol is available to complete the transfer and at a second date when it is determined that the real-time transfer protocol is not available to complete the transfer, the second date being before the first date.

In one or more embodiments, the one or more interface elements include a notification for initiating the transfer and the signal causes the client device to display the notification at a first date when it is determined that the real-time transfer protocol is available to complete the transfer and the signal causes the client device to display the notification at a second date when it is determined that the real-time transfer protocol is not available to complete the transfer, the second date being before the first date.

In one or more embodiments, the one or more interface elements include a first data field for scheduling the transfer and the signal causes the client device to complete the first data field to indicate a first date when it is determined that the real-time transfer protocol is available to complete the transfer and the signal causes the client device to complete the first data field to indicate a second date when it is determined that the real-time transfer protocol is not available to complete the transfer, the second date being before the first date.

In one or more embodiments, the information associated with the request to transfer data indicates an amount of resources to be transferred to the data record, the one or more interface elements include a second data field for indicating the amount of resources to be transferred and the signal causes the client device to complete the second data field to indicate the amount of resources to be transferred to the data record.

In one or more embodiments, the information associated with the request to transfer data to the data record indicates a deadline to complete the transfer.

In one or more embodiments, when determining, based on the identifier associated with the data record, whether the real-time transfer protocol is available to complete the transfer, the instructions, when executed, further configure the processor to send, via the communications module and to a database, a signal that includes the identifier associated with the data record and requesting confirmation that the real-time transfer protocol is available to complete the transfer to the data record.

In one or more embodiments, the identifier associated with the data record identifies an institution associated with the data record.

In one or more embodiments, the one or more interface elements include a selectable option that, when selected, initiates the transfer.

In one or more embodiments, the instructions, when executed, further configure the processor to receive, via the communications module and from the client device, a signal indicating selection of the selectable option to initiate the transfer; and responsive to receiving the signal indicating selection of the selectable option to complete the transfer, initiate the transfer using the real-time transfer protocol when it is determined that the real-time transfer protocol is available to complete the transfer and initiate the transfer using a non-real-time transfer protocol when it is determined that the real-time transfer protocol is not available to complete the transfer.

According to another aspect there is provided a method comprising obtaining information associated with a request to transfer data to a data record; determining, based on an identifier associated with the data record, whether a real-time transfer protocol is available to complete the transfer; and sending, to a client device associated with a recipient of the request to transfer the data to the data record, a signal updating one or more interface elements of an interface displayed on the client device based on whether the real-time transfer protocol is available to complete the transfer.

In one or more embodiments, the signal updating the one or more interface elements is sent at a first date when it is determined that the real-time transfer protocol is available to complete the transfer and at a second date when it is determined that the real-time transfer protocol is not available to complete the transfer, the second date being before the first date.

In one or more embodiments, the one or more interface elements include a notification for initiating the transfer and the signal causes the client device to display the notification at a first date when it is determined that the real-time transfer protocol is available to complete the transfer and the signal causes the client device to display the notification at a second date when it is determined that the real-time transfer protocol is not available to complete the transfer, the second date being before the first date.

In one or more embodiments, the one or more interface elements include a first data field for scheduling the transfer and the signal causes the client device to complete the first data field to indicate a first date when it is determined that the real-time transfer protocol is available to complete the transfer and the signal causes the client device to complete the first data field to indicate a second date when it is determined that the real-time transfer protocol is not available to complete the transfer, the second date being before the first date.

In one or more embodiments, the information associated with the request to transfer data indicates an amount of resources to be transferred to the data record, the one or more interface elements include a second data field for indicating the amount of resources to be transferred and the signal causes the client device to complete the second data field to indicate the amount of resources to be transferred to the data record.

In one or more embodiments, the information associated with the request to transfer data to the data record indicates a deadline to complete the transfer.

In one or more embodiments, determining, based on the identifier associated with the data record, whether the real-time transfer protocol is available to complete the transfer comprises sending, to a database, a signal that includes the identifier associated with the data record and requesting confirmation that the real-time transfer protocol is available to complete the transfer to the data record.

In one or more embodiments, the one or more interface elements include a selectable option that, when selected, initiates the transfer.

In one or more embodiments, the method further comprises receiving, from the client device, a signal indicating selection of the selectable option to initiate the transfer; and responsive to receiving the signal indicating selection of the selectable option to complete the transfer, initiate the transfer using the real-time transfer protocol when it is determined that the real-time transfer protocol is available to complete the transfer and initiate the transfer using a non-real-time transfer protocol when it is determined that the real-time transfer protocol is not available to complete the transfer.

According to another aspect there is provided a non-transitory computer readable storage medium comprising processor-executable instructions which, when executed, configure a processor to obtain information associated with a request to transfer data to a data record; determine, based on an identifier associated with the data record, whether a real-time transfer protocol is available to complete the transfer; and send, via a communications module and to a client device associated with a recipient of the request to transfer the data to the data record, a signal updating one or more interface elements of an interface displayed on the client device based on whether the real-time transfer protocol is available to complete the transfer.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 illustrates an exemplary system 100 consistent with certain disclosed embodiments. As shown in FIG. 1, the system 100 may include a client device 110, a server computer system 120, a database 130 associated with the server computer system 120, a transfer protocol server 140, and a network 150 connecting one or more of the components of the system 100.

The client device 110 may be a computing device. The client device 110 may take a variety of forms including, for example, a mobile communication device such as a smartphone, a tablet computer, a wearable computer (such as a head-mounted display or smartwatch), a laptop or desktop computer, or a computing device of another type. The client device 110 may be associated with a client entity (e.g., an individual, an organization, etc.) having resources that are managed by or via the server computer system 120. For example, the server computer system 120 may be a financial institution server and the client entity may be a customer of a financial institution operating the financial institution server. The client device 110 may store software instructions that cause the client device 110 to establish communications with the server computer system 120.

The server computer system 120 may maintain a database that includes various data records. For example, the server computer system 120 may be a financial institution server which may maintain customer bank accounts. In this example, a data record may, for example, reflect an amount of value stored in a particular account associated with a user. The amount of value may include a quantity of currency.

The server computer system 120 maintains the database 130. The database 130 may include data records and at least some of the data records may be associated with identifying one or more institutions and indications as to whether or not the one or more institutions support one or more transfer protocols. The one or more institutions may include one or more billers, that is, one or more institutions that issue bills.

At least some of the data records may be in the form of a look-up table that may be used to identify whether or not a particular transfer protocol is available to complete a transfer to a data record associated with the biller. The server computer system 120 may communicate signals to the database 130 to update the one or more data records to indicate whether or not a particular biller supports one or more transfer protocols. The server computer system 120 may additionally communicate signals to the database 130 to update the one or more data records to add one or more billers thereto and to indicate whether or not a particular transfer protocol is available to complete a transfer to a data record associated with the biller.

The transfer protocol server 140 may facilitate transfers between data records using one or more transfer protocols. A data transfer request may include a request to transfer data from a first data record maintained by the server computer system 120 to a second data record maintained by a third party server computer system. As an example, the first data record may include a data record associated with a customer who is responsible to pay a bill and the second data record may include a data record associated with the biller, that is, the institution who issued the bill.

The server computer system 120 may initiate a transfer of data by sending a signal to the transfer protocol server 140 that includes a request to transfer data to the data record associated with the biller. In this embodiment, the transfer protocol server 140 may be configured to complete data transfers using one or more transfer protocols. In another embodiment, multiple transfer protocol servers may be used where each transfer protocol server is configured to complete data transfers using a particular transfer protocol. The transfer protocol server 140 may be associated with a third party that is different from the institution associated with the server computer system 120.

The client device 110, the server computer system 120 and the transfer protocol server 140 may be in geographically disparate locations. Put differently, the client device 110 may be remote from the server computer system 120 and/or the transfer protocol server 140.

The network 150 is a computer network. In some embodiments, the network 150 may be an internetwork such as may be formed of one or more interconnected computer networks. For example, the network 150 may be or may include an Ethernet network, an asynchronous transfer mode (ATM) network, a wireless network, or the like.

Figure 2A:
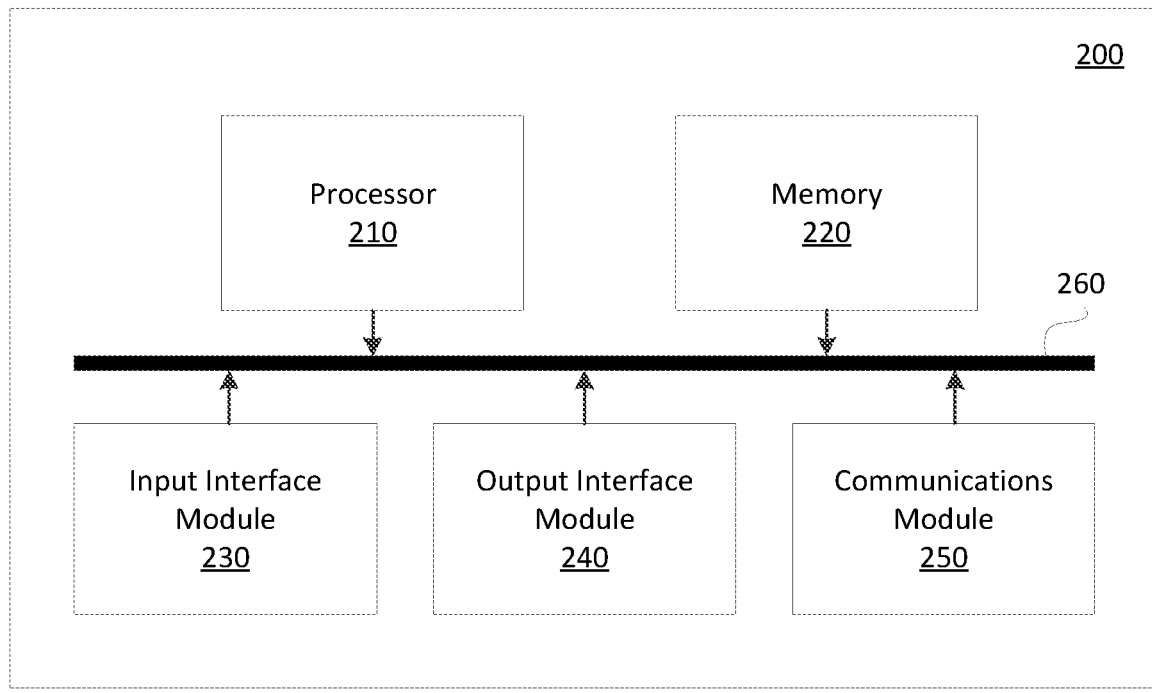
FIG. 2A is a high-level schematic diagram of an example computing device.

FIG. 2A is a high-level operation diagram of an example computing device 200. In some embodiments, the example computing device 200 may be exemplary of one or more of the client device 110, the server computer system 120 and the transfer protocol server 140. The example computing device 200 includes a variety of modules. For example, as illustrated, the example computing device 200, may include a processor 210, a memory 220, an input interface module 230, an output interface module 240, and a communications module 250. As illustrated, the foregoing example modules of the example computing device 200 are in communication over a bus 260.

The processor 210 is a hardware processor. Processor 210 may, for example, be one or more ARM, Intel x86, PowerPC processors, or the like.

The memory 220 allows data to be stored and retrieved. The memory 220 may include, for example, random access memory, read-only memory, and persistent storage. Persistent storage may be, for example, flash memory, a solid-state drive, or the like. Read-only memory and persistent storage are a computer-readable medium. A computer-readable medium may be organized using a file system such as may be administered by an operating system governing overall operation of the example computing device 200.

The input interface module 230 allows the example computing device 200 to receive input signals. Input signals may, for example, correspond to input received from a user. The input interface module 230 may serve to interconnect the example computing device 200 with one or more input devices. Input signals may be received from input devices by the input interface module 230. Input devices may, for example, include a touchscreen input, keyboard, trackball, or the like. In some embodiments, all or a portion of the input interface module 230 may be integrated with an input device. For example, the input interface module 230 may be integrated with one of the aforementioned example input devices.

The output interface module 240 allows the example computing device 200 to provide output signals. Some output signals may, for example, allow provision of output to a user. The output interface module 240 may serve to interconnect the example computing device 200 with one or more output devices. Output signals may be sent to output devices by output interface module 240. Output devices may include, for example, a display screen such as, for example, a liquid crystal display (LCD), a touchscreen display. Additionally, or alternatively, output devices may include devices other than screens such as for example a speaker, indicator lamps (such as for example light-emitting diodes (LEDs)), and printers. In some embodiments, all or a portion of the output interface module 240 may be integrated with an output device. For example, the output interface module 240 may be integrated with one of the aforementioned example output devices.

The communications module 250 allows the example computing device 200 to communicate with other electronic devices and/or various communications networks. For example, the communications module 250 may allow the example computing device 200 to send or receive communications signals. Communications signals may be sent or received according to one or more protocols or according to one or more standards. For example, the communications module 250 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 250 may allow the example computing device 200 to communicate using near-field communication (NFC), via Wi-Fi™, using Bluetooth™ or via some combination of one or more networks or protocols. Contactless payments may be made using NFC. In some embodiments, all or a portion of the communications module 250 may be integrated into a component of the example computing device 200. For example, the communications module may be integrated into a communications chipset.

Software comprising instructions is executed by the processor 210 from a computer-readable medium. For example, software may be loaded into random-access memory from persistent storage of memory 220. Additionally, or alternatively, instructions may be executed by the processor 210 directly from read-only memory of memory 220.

Figure 2B:
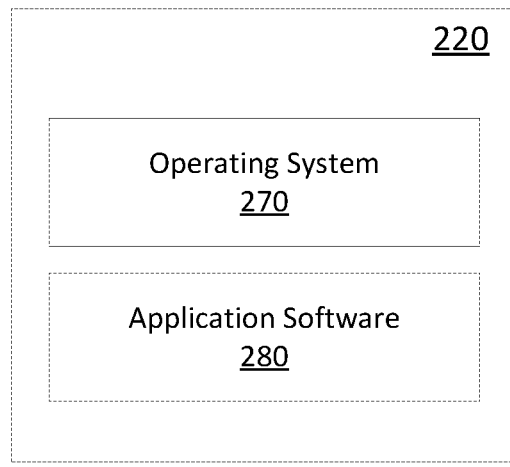
FIG. 2B is a schematic block diagram showing a simplified organization of software components stored in memory of the example computing device of FIG. 2A.

FIG. 2B depicts a simplified organization of software components stored in memory 220 of the example computing device 200. As illustrated these software components include an operating system 270 and application software 280.

The operating system 270 is software. The operating system 270 allows the application software 280 to access the processor 210, the memory 220, the input interface module 230, the output interface module 240 and the communications module 250. The operating system 270 may be, for example, Apple iOS™, Google Android™, Linux™ Microsoft Windows™, or the like.

The application software 280 adapts the example computing device 200, in combination with the operating system 270, to operate as a device performing particular functions. In some embodiments, the application software 280 may include a resource management application. The resource management application may, for example, be a personal banking application that enables users to perform various actions for managing their bank accounts using a personal computing device (e.g., laptop, mobile phone, etc.).

Through the resource management application, the server computer system 120 may provide a user interface that is displayed on a display screen of the client device 110. The user interface may include one or more interface elements. The one or more interface elements may be associated with initiating or scheduling a transfer of data to a data record.

The user interface may be associated with initiating and/or scheduling a bill payment to a particular biller. In this example, the user interface may include one or more interface elements in the form of data fields. Specifically, the user interface may include a first data field for scheduling a transfer of data to a data record associated with the biller and a second data field for indicating an amount of resources to be transferred.

The user interface may include a mobile banking interface. In this example, the user interface may include one or more interface elements in the form of a notification. Specifically, the user interface may include an in-application notification that is displayed such that it overlaps the mobile banking interface or such that it is displayed within the mobile banking interface. The notification may include a notification for initiating and/or scheduling a bill payment to a particular biller. In another embodiment, the notification may be an operating system level notification that is displayed such that it overlaps a home screen or a lock screen displayed on the client device. The notification may be a pop-up notification or may be a displayed within a designated notification area within the user interface.

In another embodiment, the user interface may include an email message, text message interface or short message service (SMS) interface and as such the one or more interface elements may include a notification sent by way of an email message, a text message or an SMS message.

The server computer system 120 may send signals to update one or more interface elements and this may be based on whether or not a particular transfer protocol is available to complete a transfer of data. Put another way, the server computer system 120 may configure or update a user interface differently based on whether or not a particular transfer protocol is available to complete a transfer of data. The server computer system 120 may additionally or alternatively schedule a transfer of data differently based on whether or not a particular transfer protocol is available and the one or more interface elements may be updated according to the scheduling of the transfer of data.

The particular transfer protocol may include a real-time transfer protocol such as for example a real-time payment rail. The real-time payment rail may be hosted by a real-time payment system that includes a real-time payment server. The real-time payment server may include the transfer protocol server 140.

In at least some embodiments, the real-time payment system is associated with a third-party and is configured to receive a data transfer request. The data transfer request may include a request to transfer data from a first data record to a second data record. The first data record may include a data record associated with a customer responsible for paying a bill (a sender) and the second data record may include a data record associated with biller (a receiver). The first data record may be associated with a first financial institution and the second data record may be associated with a second financial institution.

The request to transfer data may be a request to transfer resources such as for example an amount of value. The amount of value may include a quantity of currency. The sender may initiate the request to transfer data using, for example, the client device 110.

The data transfer request may be formatted as an ISO20022 message and may include one or more parameters. The ISO20022 format is a data-rich messaging format that provides the real-time data transfer rail with a clear and nuanced format of data. The one or more parameters may be included as metadata in the data transfer request. The one or more parameters may include resource definition data. The resource definition data defines what is requested to be transferred. By way of example, the resource definition data may define a resource that is stored in or otherwise associated with a data record associated with the sender. The resource may represent an amount of value, such as a quantity of a currency. Since the ISO20022 format is a data-rich messaging format that provides the real-time data transfer rail with a clear and nuanced format of data, the likelihood of errors and thus processing delays is minimized and as a result the real-time payment rail is able to facilitate data transfers in real-time.

Responsive to receiving the data transfer request, the real-time payment system may complete the data transfer request using the real-time payment rail. Specifically, the real-time payment server is configured to receive the data transfer request and to facilitate the data transfer from the first data record associated with the customer responsible for paying the bill (the sender) to the second data record associated with the biller (the receiver) in real-time. In at least some embodiments, the data transfer is irrevocable, that is, the sender cannot retrieve the data transfer after it has been sent.

The real-time payment rail is able to complete data transfer requests in real-time or near real-time. In at least some embodiments, real-time is defined as being within seconds. In at least some embodiments, real-time may be limited by network traffic.

It will be appreciated that the real-time payment rail is available 24×7×365, that is, twenty four (24) hours a day, seven (7) days a week, and three hundred and sixty five (365) days per year.

Figure 3:
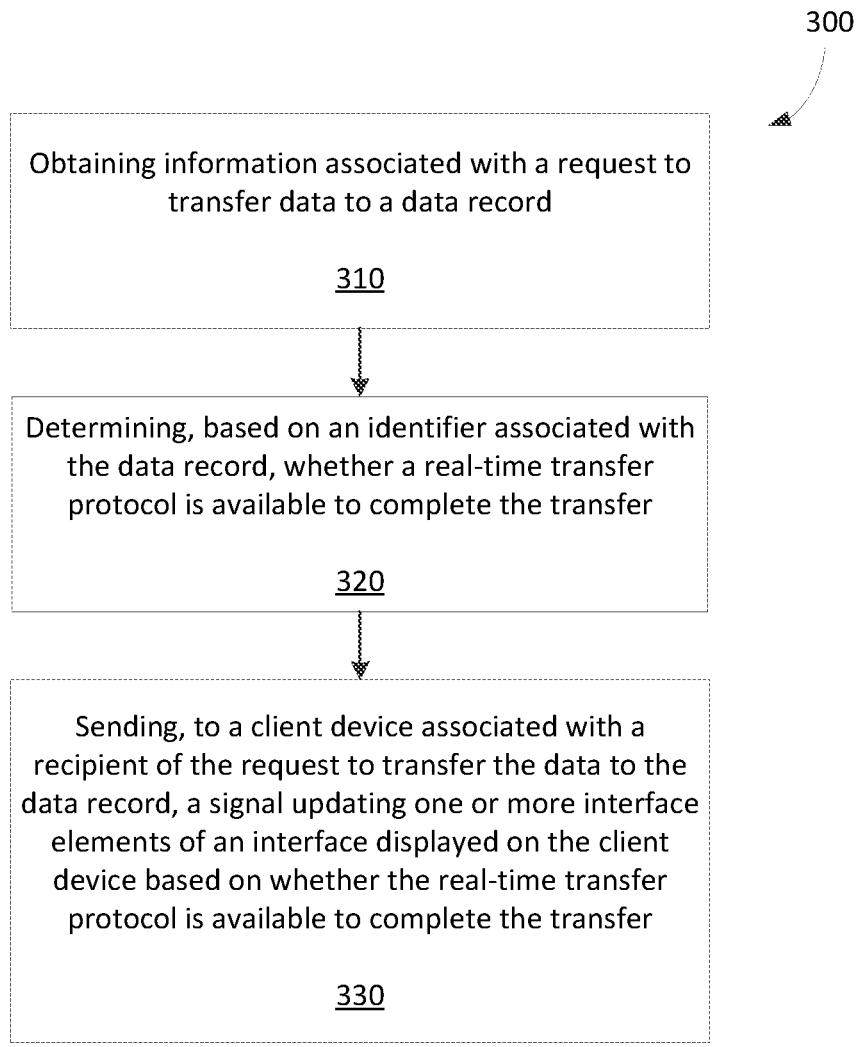
FIG. 3 shows, in flowchart form, an example method for updating interface elements based on real-time transfer protocol availability.

Reference is made to FIG. 3, which illustrates, in flowchart form, a method 300 for updating interface elements based on real-time transfer protocol availability. The method 300 may be implemented by a computing device having suitable processor-executable instructions for causing the computing device to carry out the described operations. The method 300 may be implemented, in whole or in part, by the server computer system 120. The server computer system 120 may off-load some operations of the method 300 to the client device 110 and/or the transfer protocol server 140 (FIG. 1).

The method 300 includes obtaining information associated with a request to transfer data to a data record (step 310).

The information associated with the request to transfer data to the data record may include an identifier associated with the data record, an amount of data to be transferred, a deadline to complete the transfer and/or an institution associated with the data record.

As an example, where the request to transfer data includes a request to transfer computing resources, the identifier associated with the data record may include an IP address of a node associated with the data record. As another example, where the request to transfer data to the data record includes a request to transfer resources, the identifier associated with the data record may include an identifier of an institution associated with the data record.

In an embodiment, the request to transfer data to a data record may include a request to transfer data from a first data record maintained by the server computer system 120 to a second data record maintained by a third party server computer system. The first data record may include a data record associated with a customer who is responsible to pay a bill and the second data record may include a data record associated with the biller, that is, the institution who issued the bill. The identifier may identify the institution who issued the bill.

The information associated with the request to transfer data to the data record may be obtained from the client device 110. For example, a user may provide information associated with the request to transfer data to the data record via a mobile banking interface displayed on the client device 110. In this example, the mobile banking interface may include a selectable option to initiate a bill payment. Once selected, the server computer system 120 may send a signal causing the client device 110 to display a user interface associated with initiating a bill payment. The user interface may include a drop-down menu that may allow the user to select the recipient of the bill payment, that is, the institution who issued the bill. The recipient of the bill payment may be referred to as the biller. The drop-down menu may provide a list of billers who previously received bill payments made by the user. The drop-down menu may alternatively provide a list of known billers and this may be based on bill payments made by all customers of the financial institution associated with the server computer system 120. It will be appreciated that the list of known billers may be maintained by the server computer system 120 and/or a database associated therewith. For example, the database 130 may maintain a list of billers.

In another embodiment, the mobile banking interface may include a selectable option to upload an electronic document that represents a bill. Once selected, the server computer system 120 may send a signal causing the client device 110 to display a window that allows the user to select the electronic document to be uploaded. The user may then select the electronic document to be uploaded and the electronic document may be sent to the server computer system 120. The server computer system 120 may analyze the electronic document using, for example, optical character recognition (OCR) to obtain information associated with the request to transfer data to the data record.

In another embodiment, the server computer system 120 may obtain information associated with the request to transfer data to the data record via email. For example, a customer may send an email to the server computer system 120 that includes an electronic document. The server computer system 120 may retrieve the electronic document and may analyze the electronic document using, for example, optical character recognition (OCR) to obtain information associated with the request to transfer data to the data record. As another example, the server computer system 120 may be provided access to the user's email account inbox via an electronic token. The server computer system 120 may retrieve one or more email messages from the inbox and may analyze the one or more email messages and/or attachments to those email messages to obtain information associated with the request to transfer data to the data record. As yet another example, the user may set up one or more rules within their email account inbox to automatically forward particular email messages to an email address associated with the server computer system 120. In this example, the particular email messages may be email messages related to billing or bills. The server computer system 120 may receive the particular email messages and may analyze the one or more particular email messages and/or attachments to those particular email messages to obtain information associated with the request to transfer data to the data record in manners similar to that described herein.

In another embodiment, the server computer system 120 may obtain information associated with the request to transfer data to the data record from a request to transfer received from the biller, that is, the institution who issued the bill.

The request to transfer may be a specially formatted message that is sent from a first server computer system to a second server computer system. In this embodiment, the request to transfer is sent from a server computer system associated with the biller (the recipient) to the server computer system 120 associated with the customer responsible for paying the bill (the sender) and this may be done via the transfer protocol server 140.

The request to transfer is a message that is sent on behalf of a recipient to initiate a transfer from the sender to the recipient. Put another way, the request to transfer is sent, on behalf of the recipient, from the server computer system associated with the recipient to the server computer system 120 associated with the sender. The request to transfer requests a transfer from a data record associated with the sender to a data record associated with the recipient. The request to transfer includes one or more identifiers that identify the record associated with the sender and/or the record associated with the recipient. The identifier(s) may be or may include an account number. The request to transfer may also include one or more identifiers that identify the server computer system 120 associated with the sender and/or that identify the server computer system associated with the recipient. Such identifiers may be or include one or more of a transit number and an institution number. The identifiers may additionally or alternatively include a name of the institution who issued the bill.

The request to transfer is a transfer initiation message. That is, the request to transfer is an initial message that may be used to cause a transfer to occur. Since the request to transfer is initiated by a recipient rather than a sender, the request to transfer may be considered a pull-style transfer, which may be contrasted with typical push-style transfers. In at least some implementations, the request to transfer may be formatted as an ISO20022 message.

The request to transfer message is specially formatted to include information associated with a request to transfer data. The information may include parameters of a transfer that is requested to be made from a sender. The parameters may be included as metadata in the transfer message. Where the request to transfer is an ISO20022 message, the parameters may be included in an ISO20022 format. The parameters may include resource definition data. The resource definition data defines what is requested to be transferred. By way of example, the resource definition data may define a resource that is stored in or otherwise associated with a record associated with the sender. The resource may be, for example, a computing resource. In another implementation, the resource may be data. In some implementations, the resource may represent an amount of value, such as a quantity of a currency.

The parameters that are included in the request to transfer may include data of another type. For example, in some implementations, the parameters may be or may include transfer scheduling data. The transfer scheduling data may represent a time when the requested transfer is to be made. This time may be, for example, a due date or deadline. The due date or deadline represents a latest time at which the transfer is to be made.

The request to transfer message may, in some implementations, be or represent a request for payment. Such a message may be referred to as a request for payment (RFP) message or a request to pay (RTP) message. In such implementations, the transfer rail may be a payment rail such as a real time payment rail and the server computer systems may be financial institution systems. In at least some such implementations, the records may represent bank accounts and a transfer may be a request to transfer value from a sender bank account to the recipient bank account. The sender bank account may be associated with a customer responsible for paying a bill and the recipient bank account may be associated with an institution who issued the bill. The request to transfer message may be sent from a first financial institution system, which is associated with a first financial institution, to a second financial institution system, which is associated with a second financial institution.

The request to transfer message is a special transfer message which is not formatted as an email or short message service (SMS) message. Rather, it is a computer-to-computer message that is formatted to be specially processed by the server computer system that receives it. In at least some implementations, the computer-to-computer message may be formatted according to the ISO20022 standard. For example, the server computer system that receives the request to transfer message may be configured to execute a process for obtaining authorization to complete a transfer in response to receiving the request to transfer. More particularly, the server computer system may be configured to only permit authorized transfers. For example, in one implementation, the server computer system may be associated with or may include a database that stores account data for a plurality of accounts and a database management system may only allow a transfer out of an account if the transfer is authorized by an authorization entity for that account, such as an account holder. Authorization may, for example, require authenticated approval using a credential such as one or more of a username, password, biometric authentication data or other credential.

The method 300 includes determining, based on an identifier associated with the data record, whether a real-time transfer protocol is available to complete the transfer (step 320).

In this embodiment, the server computer system 120 obtains the identifier from the information associated with the request to transfer data to the data record. The identifier may include a name of an institution associated with the data record and/or may include a name of a financial institution associated with the data record. For example, in embodiments where the request to transfer data is a bill payment, the identifier may include the name of the institution who issued the bill and/or the name or institution number of the financial institution that maintains a bank account of the institution who issued the bill.

Figure 4:
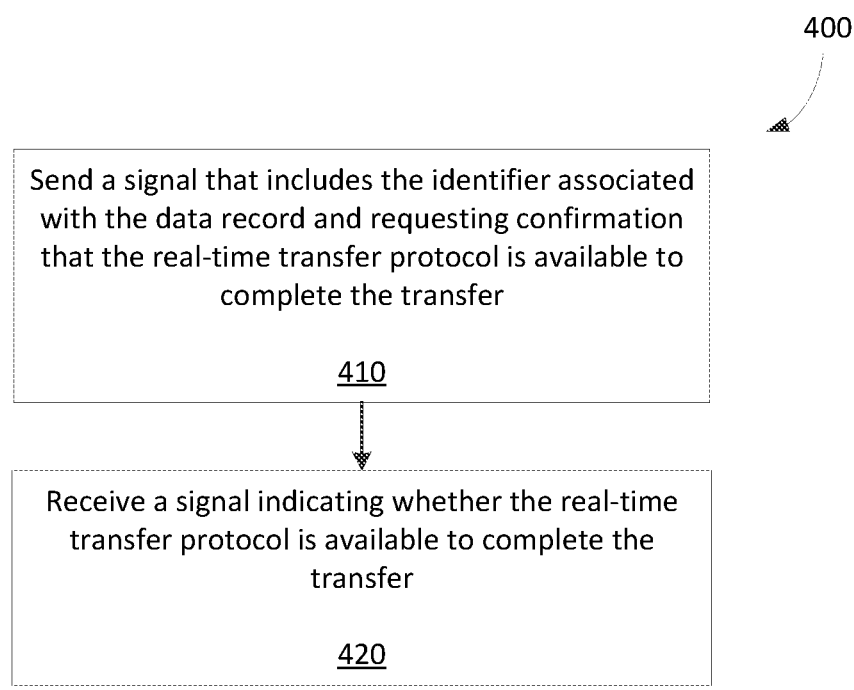
FIG. 4 shows, in flowchart form, an example method for determining whether a real-time transfer protocol is available to complete a transfer.

Reference is made to FIG. 4, which illustrates, in flowchart form, a method 400 for determining whether a real-time transfer protocol is available to complete a transfer. The method 400 may be implemented by a computing device having suitable processor-executable instructions for causing the computing device to carry out the described operations. The method 400 may be implemented, in whole or in part, by the server computer system 120. The server computer system 120 may off-load some operations of the method 400 to the client device 110 and/or the transfer protocol server 140 (FIG. 1).

The method 400 includes sending a signal that includes the identifier associated with the data record and requesting confirmation that the real-time transfer protocol is available to complete the transfer (step 410).

As mentioned, the database 130 includes data records that may be in the form of a look-up table used to identify whether or not a particular transfer protocol is available to complete a transfer to a data record associated with the biller. As such, the signal may be sent to the database 130.

Responsive to receiving the signal, the database may perform a look-up using the identifier associated with the data record to identify whether or not the real-time transfer protocol is available, that is, whether or not the data record supports the real-time transfer protocol. Responsive to determining that the data record supports the real-time transfer protocol, the database may send a signal to the server computer system 120 identifying that the real-time transfer protocol is available to complete the transfer. The signal may be a binary response signal that indicates "YES" when it is determined that the institution supports the real-time transfer protocol.

Responsive to determining that the data record does not support the real-time transfer protocol, the database may send a signal to the server computer system 120 identifying that the real-time transfer protocol is not available to complete the transfer. The signal may be a binary response signal that indicates "NO" when it is determined that the data record does not support the real-time transfer protocol and/or when the identifier cannot be found in the look-up table.

In another embodiment, rather than being sent to the database 130, the server computer system 120 may send the signal to an application programming interface (API). The API may be associated with a database that may include data records and at least some of the data records may be associated with identifying one or more institutions and indications as to whether or not the one or more institutions support one or more transfer protocols. In this embodiment, the signal may be in the form of an API request. The API may be configured to generate a binary response that indicates whether or not the real-time transfer protocol is available.

The method 400 includes receiving a signal indicating whether the real-time transfer protocol is available to complete the transfer (step 420).

The server computer system 120 receives the signal indicating whether the real-time transfer protocol is available. For example, the server computer system 120 may receive a binary response signal that indicates that the real-time transfer protocol is available or may receive a binary response signal that indicates that the real-time transfer protocol is not available.

Referring back to FIG. 3, the method 300 includes sending, to a client device associated with a recipient of the request to transfer the data to the data record, a signal updating one or more interface elements of an interface displayed on the client device based on whether the real-time transfer protocol is available to complete the transfer (step 330).

The one or more interface elements of the interface displayed on the client device may be updated based on whether or not the real-time transfer protocol is available to complete the transfers. As mentioned, the one or more interface elements may be associated with initiating or scheduling a transfer of data to a data record. The one or more interface elements may include one or more data fields and/or one or more notifications.

As mentioned, the information associated with the request to transfer data may indicate a deadline to complete the transfer. As such, in an embodiment, the signal updating the one or more interface elements may be sent at a time based on whether or not the real-time transfer protocol is available. Specifically, the signal updating the one or more interface elements may be sent at a first date when it is determined that the real-time transfer protocol is available to complete the transfer and at a second date when it is determined that the real-time transfer protocol is not available to complete the transfer. The first date may be, for example, equal to the deadline to complete the transfer. The second date may be before the first date and may be based on processing time required to complete the transfer using a non-real-time transfer protocol. For example, the second date may be three (3) business days before the deadline. In this manner, the server computer system 120 may schedule the sending of the signal that updates the one or more interface elements of the interface and the signal may be sent according to the schedule.

The one or more interface elements may include a notification for initiating the transfer. The notification may be an in-application notification and/or an operating system level notification. The notification may notify the user that a bill payment is due. In this embodiment, the signal may cause the client device 110 to display the notification at a first date when it is determined that the real-time transfer protocol is available to complete the transfer and the signal may cause the client device 110 to display the notification at a second date when it is determined that the real-time transfer protocol is not available to complete the transfer. The first date may be, for example, equal to the deadline to complete the transfer. The second date may be before the first date and may be based on processing time required to complete the transfer using a non-real-time transfer protocol. For example, the second date may be three (3) business days before the deadline. In this manner, the server computer system 120 may schedule when the notification is displayed on the client device 110 and this may be based on whether or not the real-time transfer protocol is available.

In one or more embodiments, the notification may be sent by way of an email, text or SMS message. In this embodiment, an email, text or SMS message interface may be updated based on whether the real-time transfer protocol is available to complete the transfer. The email, text or SMS message may include a selectable option such as for example a hyperlink that, when selected, directs the client device 110 to a mobile banking interface to initiate the transfer and/or may include a selectable option that, when selected, initiates the transfer.

The one or more interface elements may include one or more data fields. Specifically, the one or more interface elements may include a first data field for scheduling a transfer. In this embodiment, the signal may cause the client device 110 to complete the first data field to indicate a first date when it is determined that the real-time transfer protocol is available to complete the transfer and the signal may cause the client device 110 to complete the first data field to indicate a second date when it is determined that the real-time transfer protocol is not available to complete the transfer. The first date may be, for example, equal to the deadline to complete the transfer. The second date may be before the first date and may be based on processing time required to complete the transfer using a non-real-time transfer protocol. For example, the second date may be three (3) business days before the deadline. In this manner, the server computer system 120 may fill the first data field to indicate when to schedule the transfer based on whether or not the real-time transfer protocol is available.

As mentioned, the information associated with the request to transfer data may indicate an amount of resources to be transferred to the data record. As such, the one or more interface elements may additionally include a second data field for indicating the amount of resources to be transferred. In this embodiment, the signal may cause the client device to complete the second data field to indicate the amount of resources to be transferred.

Using the information associated with the request to transfer data obtained during step 310, the server computer system 120 may update one or more interface elements based on whether the real-time transfer protocol is available to complete the transfer and this may be done without requiring input of one or more parameters by the sender. By way of example, one or more parameters that are included in the request to transfer may be used to pre-stage or pre-populate parameters of the transfer so that the sender does not have to input such parameters. In some implementations, the resource definition data included in the request to transfer may be used to initiate the transfer without having the sender define what is to be transferred. For example, where the transfer is a transfer of an amount of value, the amount of value defined in the request for transfer message may be used so that the sender does not have to define the amount of value. Further, transfer scheduling data included in the request to transfer message may be used to schedule the transfer without requiring the sender to define such a schedule. For example, where the transfer scheduling data is a due date or deadline, the server computer system 120 may automatically define a time for a transfer based on the transfer scheduling data without requiring the sender to input such a time.

As mentioned, the interface displayed on the client device 110 may include an interface element that includes a drop-down menu that provides a list of billers, where the user is able to select which biller to initiate a transfer to. In this embodiment, the server computer system 120 may update the drop-down menu to indicate whether or not the real-time transfer protocol is available. Specifically, the server computer system 120 may display a biller that is eligible to receive real-time transfers differently than a biller that is not eligible to receive real-time transfers. For example, a special logo or other graphical element may be displayed adjacent to billers who are eligible to receive real-time transfers.

The information associated with the request to transfer data to the data record may be obtained from the client device 110. For example, a user may provide information associated with the request to transfer data to the data record via a mobile banking interface displayed on the client device 110. In this example, the mobile banking interface may include a selectable option to initiate a bill payment. Once selected, the server computer system 120 may send a signal causing the client device 110 to display a user interface associated with initiating a bill payment. As mentioned, the user interface may include a drop-down menu that may provide a list of billers that can be selected by the user.

In at least some manners described herein with reference to the method 300, the server computer system 120 may send signals to update one or more interface elements and this may be based on whether or not the real-time transfer protocol is available to complete a transfer of data. Put another way, the server computer system 120 may send one or more signals to provide, configure or update a user interface and this may be based on whether or not the real-time transfer protocol is available to complete a transfer of data. The server computer system 120 may additionally or alternatively schedule the transfer of data differently based on whether or not the real-time transfer protocol is available and one or more interface elements may be updated according to the scheduling of the transfer of data.

In at least some manners described herein with reference to the method 300, the transfer of data may include bill payments and as such the server computer system 120 may update interface elements associated with bill payments and this may be done based on whether or not an account associated with a particular biller accepts real-time transfers. For example, the server computer system 120 may schedule when an interface element such as a notification is to be presented to a user and this may be based on the payment due date and based on whether or not the biller accepts real-time transfers. As another example, the server computer system 120 may complete or update one or more interface elements such as data fields and this may be based on the payment due date and based on whether or not the biller accepts real-time transfers.

Figure 5:
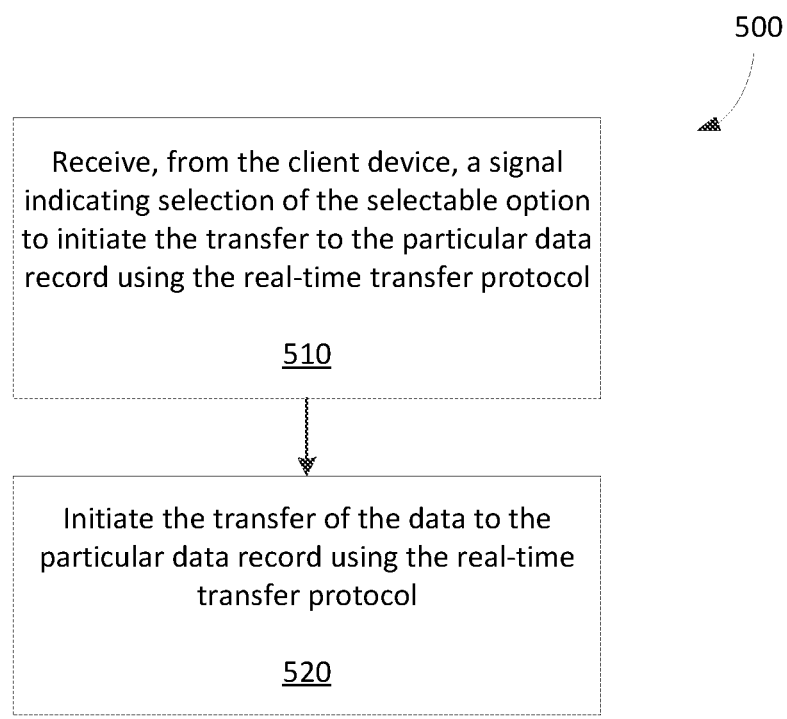
FIG. 5 shows, in flowchart form, an example method for initiating a data transfer using a real-time transfer protocol.

As mentioned, the one or more interface elements may include a selectable option that, when selected, initiates the transfer. Reference is made to FIG. 5, which illustrates, in flowchart form, a method 500 for initiating the transfer. The method 500 may be implemented by a computing device having suitable processor-executable instructions for causing the computing device to carry out the described operations. The method 500 may be implemented, in whole or in part, by the server computer system 120. The server computer system 120 may off-load some operations of the method 500 to the client device 110 and/or the transfer protocol server 140 (FIG. 1).

The method 500 includes receiving, from the client device 110, a signal indicating selection of the selectable option to initiate the transfer (step 510).

In this embodiment, responsive to the user selecting the selectable option displayed on the client device 110, the client device 110 sends a signal indicating selection of the selectable option to initiate the transfer to the server computer system 120.

Responsive to receiving the signal indicating selection of the selectable option, the method 500 includes initiating the transfer using the real-time transfer protocol when it is determined that the real-time transfer protocol is available to complete the transfer and initiating the transfer using a non-real-time transfer protocol when it is determined that the real-time transfer protocol is not available to complete the transfer (step 520).

In this embodiment, the server computer system 120 may generate a data transfer request and communicate the data transfer request to the transfer protocol server 140. In embodiments where the server computer system 120 has scheduled the data transfer, the server computer system 120 may communicate the data transfer request to the transfer protocol server 140 at the scheduled time. For example, when it is determined that the real-time transfer protocol is available to complete the transfer, the data transfer request may be communicated to the real-time transfer protocol on the deadline to complete the transfer. In embodiments where the real-time transfer protocol includes a real-time payment rail, the transfer request may be formatted and encrypted as an ISO 20022 message and may include one or more parameters. The one or more parameters may be included as metadata in the data transfer request. The one or more parameters may include resource definition data that defines the nominal value. The transfer request is sent to the transfer protocol server 140.

The data transfer request may be formatted as an ISO20022 message and may include one or more parameters. The ISO20022 format is a data-rich messaging format that provides the real-time data transfer rail with a clear and nuanced format of data. The one or more parameters may be included as metadata in the data transfer request. The one or more parameters may include resource definition data. The resource definition data defines what is requested to be transferred. By way of example, the resource definition data may define a resource that is stored in or otherwise associated with a data record associated with the sender. The resource may represent an amount of value, such as a quantity of a currency. Since the ISO20022 format is a data-rich messaging format that provides the real-time data transfer rail with a clear and nuanced format of data, the likelihood of errors and thus processing delays is minimized and as a result the real-time payment rail is able to facilitate data transfers in real-time.

Responsive to receiving the data transfer request, the real-time payment system may complete the data transfer request using the real-time payment rail. Specifically, the real-time payment server is configured to receive the data transfer request and to facilitate the data transfer from the first data record associated with the customer responsible for paying the bill (the sender) to the second data record associated with the biller (the receiver) in real-time. In at least some embodiments, the data transfer is irrevocable, that is, the sender cannot retrieve the data transfer after it has been sent.

The real-time payment rail is able to complete data transfer requests in real-time or near real-time. In at least some embodiments, real-time is defined as being within seconds. In at least some embodiments, real-time may be limited by network traffic.

It will be appreciated that the real-time payment rail is available 24×7×365, that is, twenty four (24) hours a day, seven (7) days a week, and three hundred and sixty five (365) days per year.

It will be appreciated that in some embodiments the server computer system 120 may generate a data transfer request and communicate the data transfer request to different servers based on whether or not the real-time transfer protocol is available. For example, the server computer system 120 may communicate the data transfer request to the transfer protocol server 140 when it is determined that the real-time transfer protocol is available and may communicate the data transfer request to a different server when it is determined that the real-time transfer protocol is not available.

In one or more embodiments, the one or more interface elements may include a selectable option that, when selected, accepts an offer for a loan. For example, the server computer system 120 may determine that the account of the user does not have enough resources to pay a particular bill and as such the server computer system 120 may generate an offer for a loan. Responsive to the user selecting the selectable option, the server computer system 120 may perform one or more steps to complete the loan and may arrange to transfer funds from an account associated with the loan to the biller.

Figure 6:
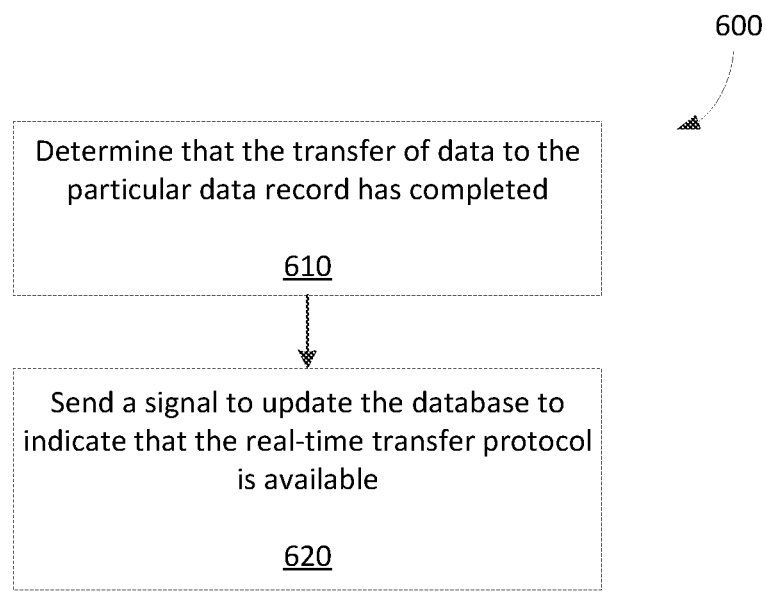
FIG. 6 shows, in flowchart form, an example method for updating a database.

As mentioned, the server computer system 120 may update the database 130 to indicate whether or not the real-time transfer protocol is available for a particular biller. Reference is made to FIG. 6, which illustrates, in flowchart form, a method 600 for updating the database 130. The method 600 may be implemented by a computing device having suitable processor-executable instructions for causing the computing device to carry out the described operations. The method 600 may be implemented, in whole or in part, by the server computer system 120. The server computer system 120 may off-load some operations of the method 600 to the client device 110 and/or the transfer protocol server 140 (FIG. 1).

The method 600 includes determining that the transfer of the data to the particular data record has completed (step 610).

In this embodiment, the transfer protocol server 140 may send a signal indicating confirmation of the data transfer using the real-time transfer protocol. Since the real-time transfer protocol is able to complete data transfer requests in real-time or near real-time, the server computer system 120 is able to determine that the transfer of data to the particular data record using the real-time transfer protocol has completed in real-time or near real-time.

The method 600 includes sending a signal to the database indicating that the real-time transfer protocol is available (step 620).

Responsive to determining that the transfer of data to the particular data record using the real-time transfer protocol has completed, the server computer system 120 may send a signal to the database 130 to indicate that the real-time transfer protocol is available for a particular biller. In response, the database may update the data records to indicate that the real-time transfer protocol is available for a particular biller.

It will be appreciated that the database 130 may be made available to one or more third party servers. For example, the database may be configured as an application programming interface (API) that may be configured to receive API requests from one or more third party servers and to generate responses to such requests. The requests may include a request for an indication as to whether or not a real-time transfer protocol is available for a particular biller. In exchange for providing the indication, the database may require that the third party server provides information relating to past transfers made to particular data records for customer accounts maintained thereby. As such, the database may be updated using this additional information. The database may be continuously and/or periodically updated in manners similar to embodiments described herein.

Figure 7:
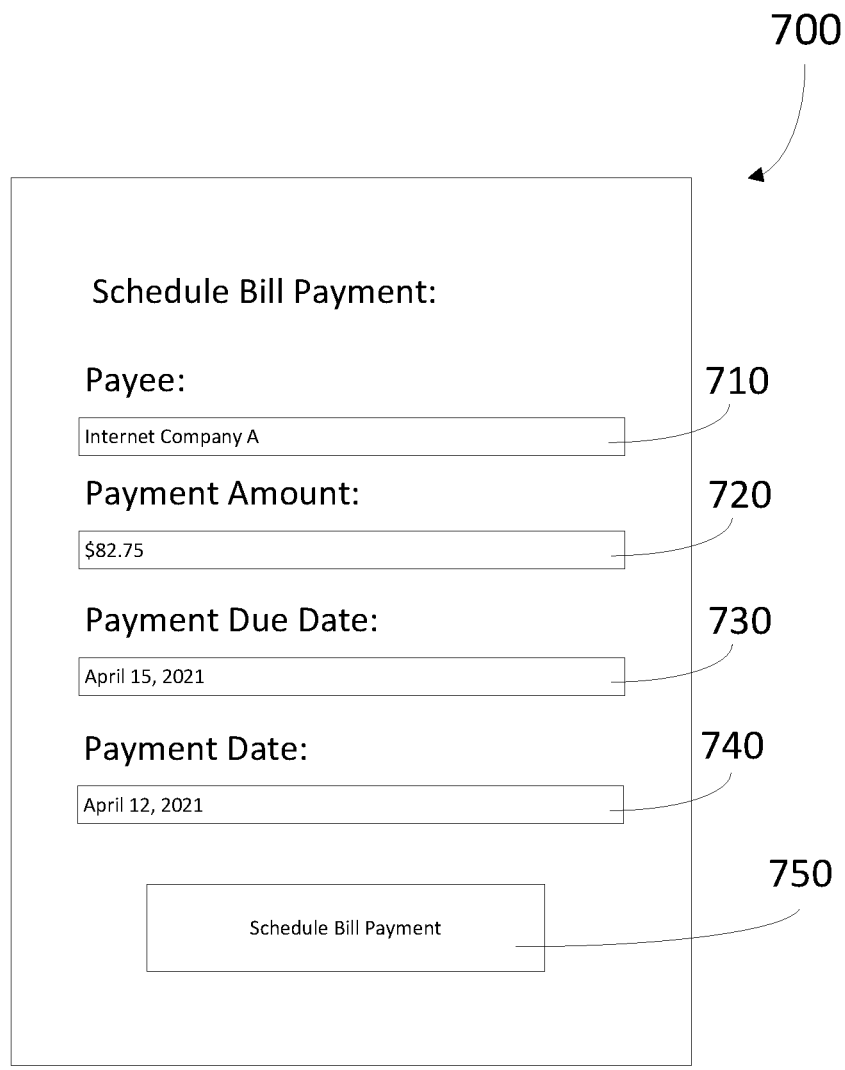
FIGS. 7 to 10 show example user interfaces.

Turning to FIG. 7, an example user interface 700 is shown. The user interface 700 includes interface elements updated based on whether the real-time transfer protocol is available to complete the transfer. In this example, the interface elements are updated based on the determination that the real-time transfer protocol is not available to complete the transfer. In this example, the user interface 700 includes an input field 710 that identifies the recipient of the transfer which in this example is a biller named "Internet Company A." The user interface 700 includes an input field 720 that defines an amount of resources to be transferred. The user interface 700 includes an input field 730 that identifies the payment due date. The user interface 700 includes an input field 740 that identifies the payment date, that is, the date on which the payment will be made. The user interface 700 includes a selectable option 750 that, when selected, initiates a transfer of data. The input fields may be completed responsive to the server computer system 120 communicating signals to the client device 110 in accordance with embodiments described herein. As will be appreciated, as shown in FIG. 7, the payment date is scheduled three (3) business days before the payment due date as the real-time transfer protocol is not available for transfers made to the account associated with the "Internet Company A".

Figure 8:
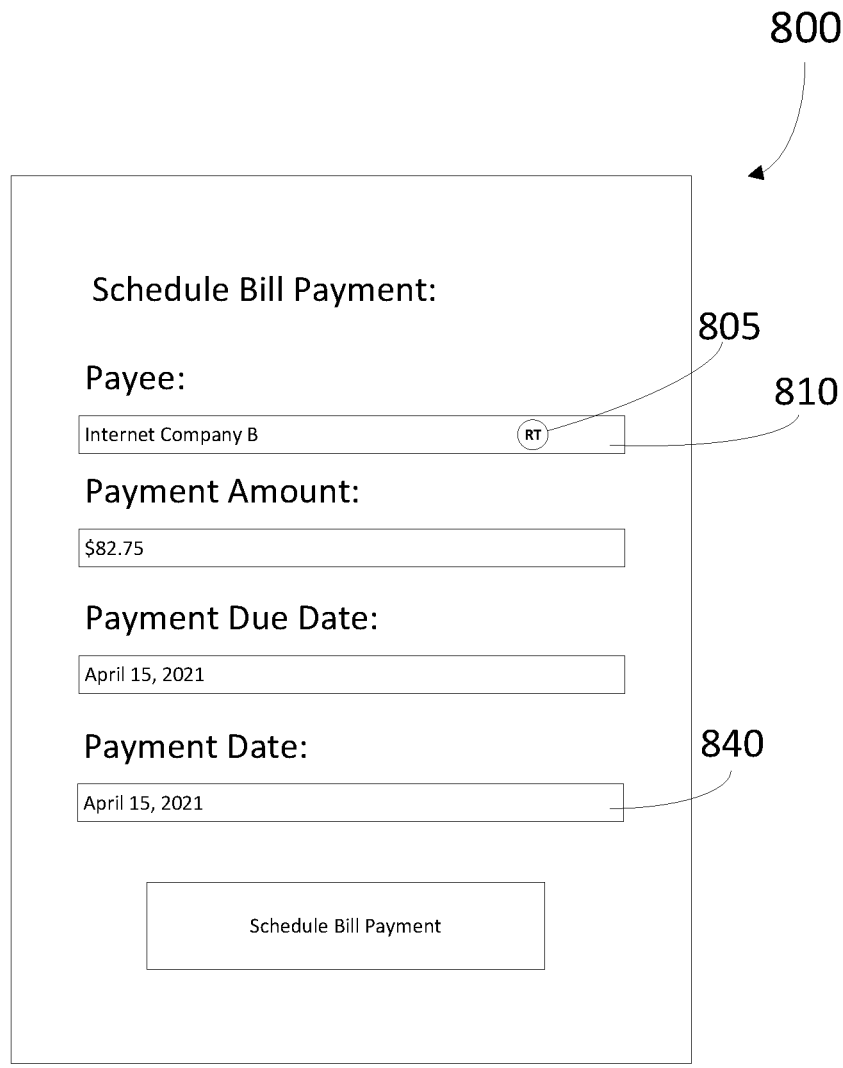

Another example user interface 800 is shown in FIG. 8. The user interface 800 is similar to that of user interface 700 with the following exceptions. In this example, the input field 810 identifies the recipient of the transfer as "Internet Company B." In accordance with embodiments described herein, the server computer system 120 may determine that the real-time transfer protocol is available for transfers made to the account associated with "Internet Company B". As such, one or more interface elements are updated. For example, the input field 810 may be updated to include a graphical element 805 indicating that the real-time transfer protocol is available to complete the transfer. Further, the input field 840 is updated to indicate that the payment date is scheduled for the same day as the payment due date and this is based on the determination that the real-time transfer protocol is available for transfers made to the account associated with the "Internet Company B."

Figure 9:
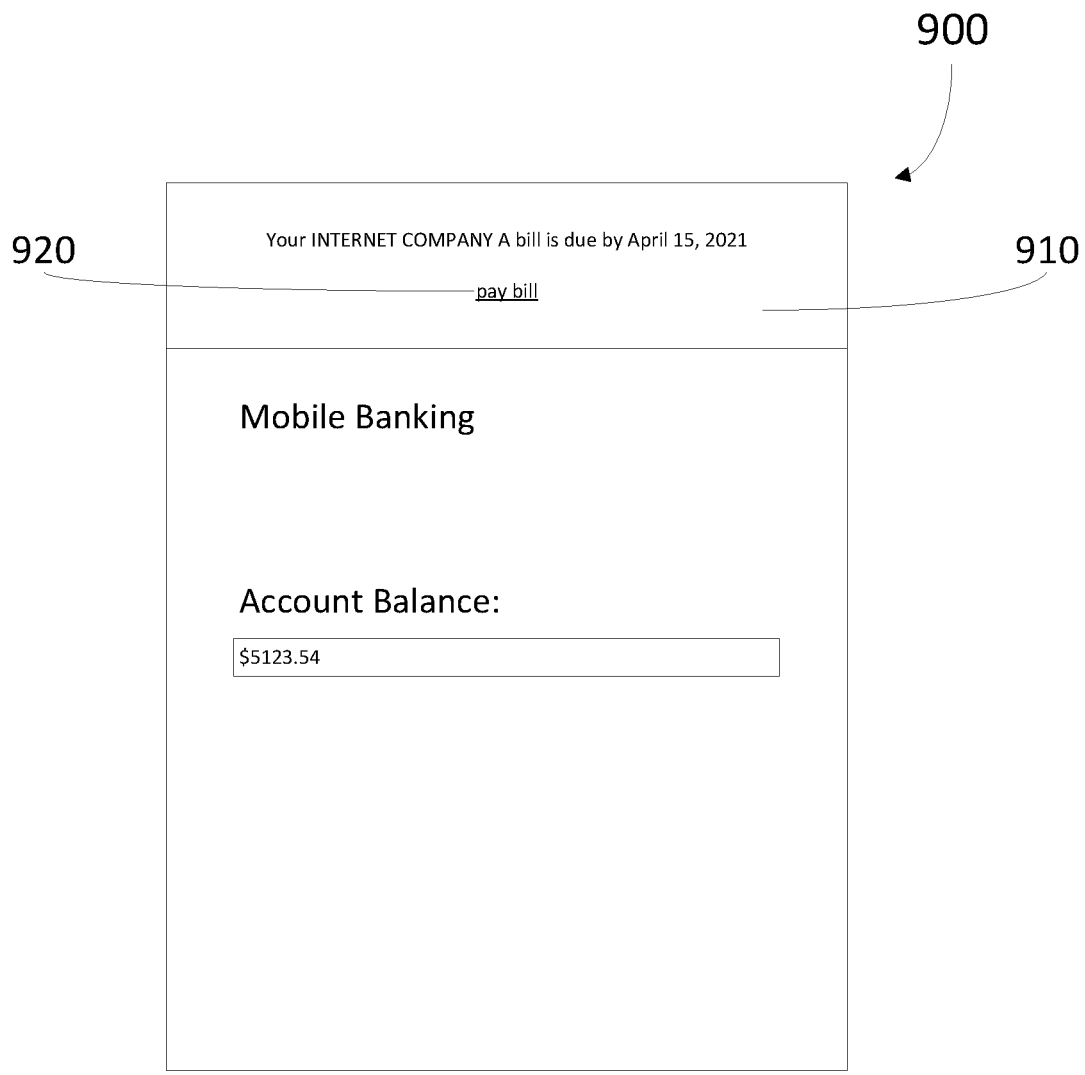

Another example user interface 900 is shown in FIG. 9. The user interface 900 includes interface elements updated or displayed based on whether the real-time transfer protocol is available to complete the transfer. In this example, the user interface 900 is a mobile banking user interface and the interface elements are updated based on the determination that the real-time transfer protocol is not available to complete the transfer. An interface element in the form of a notification 910 is displayed such that it overlaps the mobile banking user interface. The notification identifies a biller named "Internet Company A" and indicates the payment due date. In this example, since the real-time transfer protocol is not available, the notification is displayed three (3) business days prior to the payment due date. The notification 910 includes a selectable option 920 that, when selected, initiates the transfer of data using the non-real-time transfer protocol.

Figure 10:
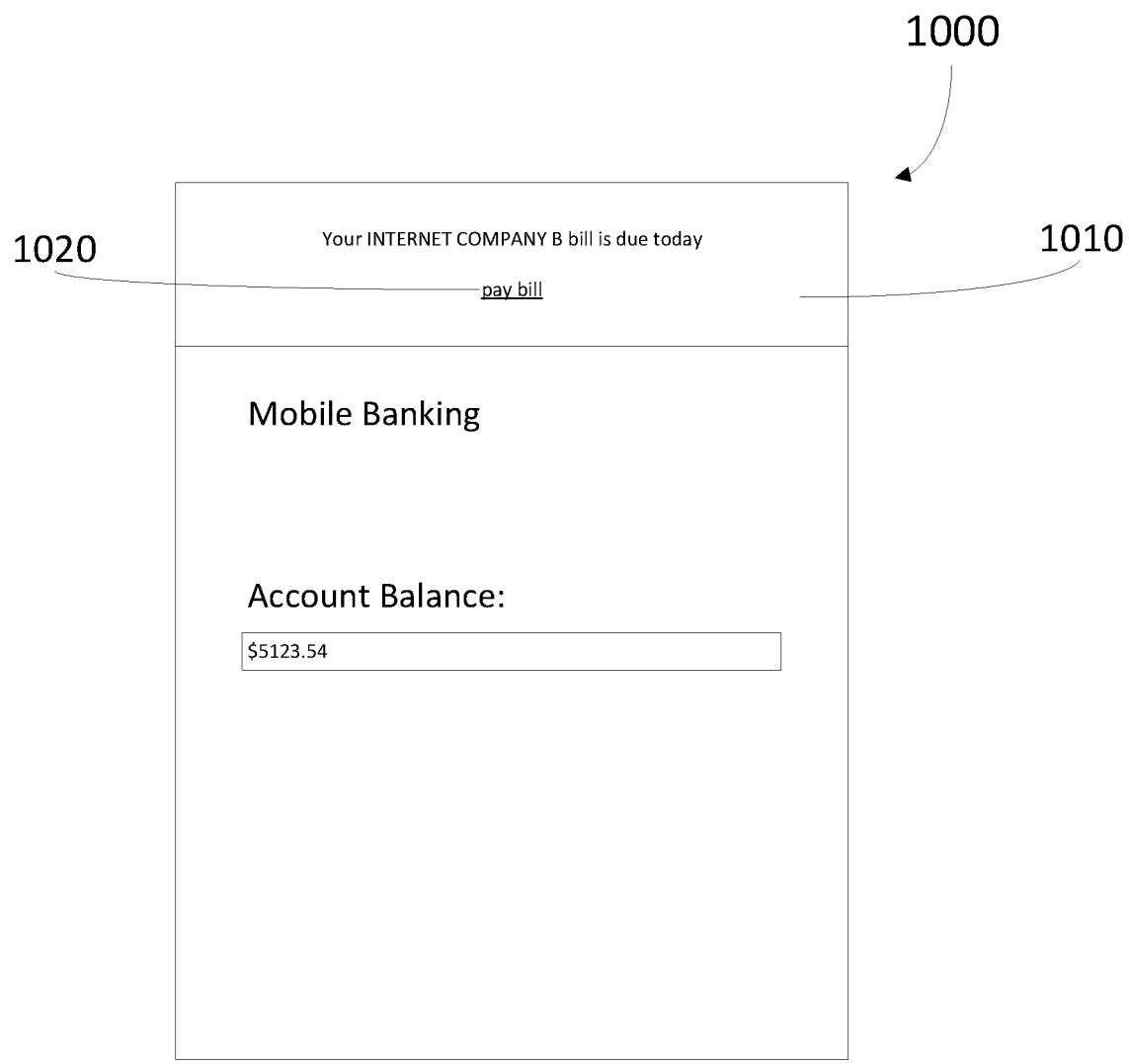

Another example user interface 1000 is shown in FIG. 10. The user interface 1000 includes interface elements updated or displayed based on whether the real-time transfer protocol is available to complete the transfer. In this example, the user interface 1000 is a mobile banking user interface and the interface elements are updated based on the determination that the real-time transfer protocol is available to complete the transfer. An interface element in the form of a notification 1010 is displayed such that it overlaps the mobile banking user interface. The notification identifies a biller named "Internet Company B" and indicates the payment due date. In this example, since the real-time transfer protocol is available, the notification is displayed on the same date as the payment due date. The notification 1010 includes a selectable option 1020 that, when selected, initiates the transfer of data using the real-time transfer protocol.

It will be appreciated that the notifications 910 and 1010 may be generated by the server computer system 120 responsive to receiving a request for payment from a server computer system associated with a biller. For example, the biller may configure the server computer system associated therewith to only send a request for payment when a particular bill has not been paid by a particular date. As such, the server computer system associated with the biller may send a request for payment to the server computer system 120 which, in turn, may update one or more interface elements to initiate bill payment.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A server computer system, comprising:
    a processor;
    a communications module coupled to the processor; and
    a memory coupled to the processor, the memory storing instructions that, when executed, configure the processor to:
        send, via the communications module, a signal that includes an identifier associated with a data record and requests an indication as to whether a real-time transfer protocol is available to complete a transfer to the data record;
        receive, via the communications module, a signal that indicates whether the real-time transfer protocol is available to complete the transfer to the data record; and
        send, via the communications module and to a client device, a signal updating one or more interface elements of an interface displayed on the client device based on whether the real-time transfer protocol is available to complete the transfer to the data record.

2. The server computer system of claim 1, wherein the instructions, when executed, further configure the processor to:
    obtain the identifier associated with the data record from a request to transfer data to the data record.

3. The server computer system of claim 2, wherein the instructions, when executed, further configure the processor to:
    receive, via the communications module, the request to transfer data to the data record.

4. The server computer system of claim 1, wherein the signal that indicates whether the real-time transfer protocol is available to complete the transfer includes a binary signal.

5. The server computer system of claim 1, wherein the signal updating the one or more interface elements is sent at a first date when it is determined that the real-time transfer protocol is available to complete the transfer and at a second date when it is determined that the real-time transfer protocol is not available to complete the transfer, the second date being before the first date.

6. The server computer system of claim 1, wherein the one or more interface elements include a notification for initiating the transfer and the signal causes the client device to display the notification at a first date when it is determined that the real-time transfer protocol is available to complete the transfer and the signal causes the client device to display the notification at a second date when it is determined that the real-time transfer protocol is not available to complete the transfer, the second date being before the first date.

7. The server computer system of claim 1, wherein the one or more interface elements include a first data field for scheduling the transfer and the signal causes the client device to complete the first data field to indicate a first date when it is determined that the real-time transfer protocol is available to complete the transfer and the signal causes the client device to complete the first data field to indicate a second date when it is determined that the real-time transfer protocol is not available to complete the transfer, the second date being before the first date.

8. The server computer system of claim 1, wherein the signal that includes the identifier associated with the data record and requests confirmation as to whether the real-time transfer protocol is available to complete the transfer to the data record is sent to one of a database or an application programming interface.

9. The server computer system of claim 1, wherein the identifier associated with the data record identifies an institution associated with the data record.

10. The server computer system of claim 1, wherein the instructions, when executed, further configure the processor to:
    receive, via the communications module and from the client device, a signal indicating selection of a selectable option to initiate the transfer; and
    responsive to receiving the signal indicating selection of the selectable option to complete the transfer, initiate the transfer using the real-time transfer protocol when it is determined that the real-time transfer protocol is available to complete the transfer and initiate the transfer using a non-real-time transfer protocol when it is determined that the real-time transfer protocol is not available to complete the transfer.

11. A method comprising:
    sending a signal that includes an identifier associated with a data record and requests an indication as to whether a real-time transfer protocol is available to complete a transfer to the data record;
    receiving a signal that indicates whether the real-time transfer protocol is available to complete the transfer to the data record; and
    sending, to a client device, a signal updating one or more interface elements of an interface displayed on the client device based on whether the real-time transfer protocol is available to complete the transfer to the data record.

12. The method of claim 11, further comprising:
obtaining the identifier associated with the data record from a request to transfer data to the data record.

13. The method of claim 12, further comprising:
receiving the request to transfer data to the data record.

14. The method of claim 11, wherein the signal that indicates whether the real-time transfer protocol is available to complete the transfer includes a binary signal.

15. The method of claim 11, wherein the signal updating the one or more interface elements is sent at a first date when it is determined that the real-time transfer protocol is available to complete the transfer and at a second date when it is determined that the real-time transfer protocol is not available to complete the transfer, the second date being before the first date.

16. The method of claim 11, wherein the one or more interface elements include a notification for initiating the transfer and the signal causes the client device to display the notification at a first date when it is determined that the real-time transfer protocol is available to complete the transfer and the signal causes the client device to display the notification at a second date when it is determined that the real-time transfer protocol is not available to complete the transfer, the second date being before the first date.

17. The method of claim 11, wherein the one or more interface elements include a first data field for scheduling the transfer and the signal causes the client device to complete the first data field to indicate a first date when it is determined that the real-time transfer protocol is available to complete the transfer and the signal causes the client device to complete the first data field to indicate a second date when it is determined that the real-time transfer protocol is not available to complete the transfer, the second date being before the first date.

18. The method of claim 11, wherein the signal that includes the identifier associated with the data record and requests confirmation as to whether the real-time transfer protocol is available to complete the transfer to the data record is sent to one of a database or an application programming interface.

19. The method of claim 11, further comprising:
receiving, from the client device, a signal indicating selection of a selectable option to initiate the transfer; and
responsive to receiving the signal indicating selection of the selectable option to complete the transfer, initiate the transfer using the real-time transfer protocol when it is determined that the real-time transfer protocol is available to complete the transfer and initiate the transfer using a non-real-time transfer protocol when it is determined that the real-time transfer protocol is not available to complete the transfer.

20. A non-transitory computer readable storage medium comprising processor-executable instructions which, when executed, configure a processor to:
send, via a communications module, a signal that includes an identifier associated with a data record and requests an indication as to whether a real-time transfer protocol is available to complete a transfer to the data record;
receive, via the communications module, a signal that indicates whether the real-time transfer protocol is available to complete the transfer to the data record; and
send, via the communications module and to a client device, a signal updating one or more interface elements of an interface displayed on the client device based on whether the real-time transfer protocol is available to complete the transfer to the data record.

* * * * *